US009049651B2

(12) United States Patent
Meylan et al.

(10) Patent No.: US 9,049,651 B2
(45) Date of Patent: Jun. 2, 2015

(54) SELECTION OF AN ACCESS POINT IN A COMMUNICATIONS SYSTEM

(75) Inventors: Arnaud Meylan, San Diego, CA (US); Manoj M. Deshpande, San Diego, CA (US); Nikhil Jain, Mendham, NJ (US); Sanjiv Nanda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 919 days.

(21) Appl. No.: 11/510,220

(22) Filed: Aug. 25, 2006

(65) Prior Publication Data

US 2008/0049702 A1 Feb. 28, 2008

(51) Int. Cl.
| H04W 36/00 | (2009.01) |
| H04W 48/20 | (2009.01) |
| H04L 29/06 | (2006.01) |
| H04W 8/18 | (2009.01) |
| H04W 12/08 | (2009.01) |

(52) U.S. Cl.
CPC ............ *H04W 48/20* (2013.01); *H04L 63/101* (2013.01); *H04W 8/183* (2013.01); *H04W 12/08* (2013.01)

(58) Field of Classification Search
USPC .............. 455/433.1–433.3, 435.1, 436, 456.1
See application file for complete search history.

(56) References Cited

U.S. PATENT DOCUMENTS

| 5,509,052 | A  | * | 4/1996  | Chia et al. .................. 455/465 |
| 7,062,271 | B2 |   | 6/2006  | Choi |
| 7,164,920 | B2 | * | 1/2007  | Giacalone et al. ........... 455/455 |
| 7,483,984 | B1 | * | 1/2009  | Jonker et al. ................ 709/226 |
| 2001/0034232 | A1 | * | 10/2001 | Kuwahara .................... 455/435 |
| 2002/0173275 | A1 | * | 11/2002 | Coutant ....................... 455/67.1 |
| 2003/0069014 | A1 | * | 4/2003  | Raffel et al. ................. 455/426 |
| 2003/0069018 | A1 | * | 4/2003  | Matta et al. .................. 455/436 |
| 2004/0082327 | A1 |   | 4/2004  | Kim et al. |
| 2004/0157608 | A1 | * | 8/2004  | Kurose et al. ................ 455/436 |
| 2004/0198220 | A1 | * | 10/2004 | Whelan et al. .............. 455/41.1 |
| 2004/0228304 | A1 | * | 11/2004 | Riedel et al. ................ 370/332 |

(Continued)

FOREIGN PATENT DOCUMENTS

| CN | 1404339 A | 3/2003 |
| EP | 1133208   | 9/2001 |

(Continued)

OTHER PUBLICATIONS

International Search Report—PCT/US07/076805, International Search Authority—European Patent Office, Mar. 26, 2008.

(Continued)

*Primary Examiner* — Christopher M Brandt
*Assistant Examiner* — Joseph Dean, Jr.
(74) *Attorney, Agent, or Firm* — Anthony R. Morris

(57) ABSTRACT

The disclosure is directed to an access terminal, and method for selecting an access point in a communications system. The access terminal may include memory and a processor. The processor may be configured to maintain in the memory a database containing a list of access points that have previously served the access terminal with at least a minimum quality of service, the processor being further configured to use the list to search for an access point to associate with, or search for an access point to handoff the access terminal to during operation. In addition to, or alternatively, the processor may also be configured to maintain in the database a second list of access points. The database may be used by the processor to search for an access point that is not on the second list to associate with, or handoff the access terminal to.

39 Claims, 5 Drawing Sheets

(56) References Cited

U.S. PATENT DOCUMENTS

| | | | |
|---|---|---|---|
| 2005/0128989 A1* | 6/2005 | Bhagwat et al. | 370/338 |
| 2005/0255847 A1* | 11/2005 | Han et al. | 455/436 |
| 2006/0104211 A1 | 5/2006 | Islam et al. | |
| 2006/0142004 A1* | 6/2006 | He et al. | 455/434 |
| 2008/0014934 A1* | 1/2008 | Balasubramanian et al. | 455/434 |

FOREIGN PATENT DOCUMENTS

| | | |
|---|---|---|
| EP | 1515512 | 3/2005 |
| GB | 2407003 A | 4/2005 |
| JP | 2000115827 A | 4/2000 |
| JP | 2000152318 A | 5/2000 |
| JP | 2000153318 A | 6/2000 |
| JP | 2000287256 A | 10/2000 |
| JP | 2001268616 A | 9/2001 |
| JP | 2002016958 A | 1/2002 |
| JP | 2004120080 A | 4/2004 |
| JP | 2004328153 A | 11/2004 |
| JP | 2004328274 A | 11/2004 |
| JP | 2004343458 A | 12/2004 |
| JP | 2006505201 A | 2/2006 |
| KR | 20060130429 | 12/2006 |
| WO | 2004049636 | 6/2004 |
| WO | 2006043131 A1 | 4/2006 |
| WO | 2006076404 | 7/2006 |
| WO | 2007137142 | 11/2007 |

OTHER PUBLICATIONS

European Search Report—EP10164472—Search Authority—Munich—Jun. 28, 2010.
Taiwan Search Report—TW096130989—TIPO—Apr. 3, 2011.
Written Opinion—PCT/US07/076805, International Search Authority, European Patent Office, Mar. 26, 2008.

* cited by examiner

SELECTION OF AN ACCESS POINT IN A COMMUNICATIONS SYSTEM

BACKGROUND

1. Field

The present disclosure relates generally to telecommunications, and more particularly, to the selection of an access point in a communications system.

2. Background

In a wireless communications system, a wireless access network may be used to connect any number of access terminals to a wide area network (WAN), such as the Internet or other packet-based network. The access network is typically implemented with any number of access points distributed throughout a geographic region. Each access point is configured to provide a point of access to one or more access terminals in its vicinity. In some implementations, the access network may be confined to a relatively small geographic region using a standard protocol, such as World Interoperability for Microwave Access (WiMAX), wireless fidelity alliance (Wi-Fi Alliance), 802.11 network technology, Bluetooth technology, ultra wide band (UWB) protocol, home radio frequency (HomeRF), or the like. These type of access networks are generally referred to as wireless local area networks (WLAN) and are often found in homes, offices, buildings, and other private and public places.

As WLANs become ubiquitous, the techniques used to select a serving access point, and roam from one access point to another, have a greater impact on the quality of service experienced by the user on an access terminal. Typically, the selection process begins with a list of access points created by the access terminal. The access terminal creates this list by scanning the spectrum of channels to discover all nearby access points. This list is used by the access terminal to associate with an access point on power up, and transition from one access point to another as the access terminal moves throughout the access network.

Depending upon the particular implementation, the scan may be either passive or active. An access terminal performs a passive scan by tuning to each channel and listening for one or more beacons. This requires the access terminal to remain on each channel for a time period equal to at least the beacon signal interval period. Alternatively, access terminal may use an active scan in which it transmits a probe on each channel. However, the access terminal must still wait for a response from one or more access points on each channel. Either way, the access terminal must scan a wide spectrum of channels and spend significant processor resources to search for access points. This results in increased power consumption and reduced battery life.

SUMMARY

An aspect of an access terminal is disclosed. The access terminal includes memory and a processor. The processor is configured to maintain in the memory a database containing a list of access points that have previously served the access terminal with at least a minimum quality of service, the processor being further configured to use the list to search for an access point.

Another aspect of an access terminal is disclosed. The access terminal includes memory and a processor. The processor is configured to maintain in the memory a database containing a list of access points, the processor being further configured to search for an access point that is not on the list.

An aspect of a method of communications on an access terminal is disclosed. The method includes maintaining a database containing a list of access points that have previously served the access terminal with at least a minimum quality of service, and using the list to search for an access point.

Another aspect of a method of communications on an access terminal is disclosed. The method includes maintaining a database containing a list of access points, and searching for an access point that is not on the list.

An aspect of an access terminal is disclosed. The access terminal includes means for maintaining a database containing a list of access points that have previously served the access terminal with at least a minimum quality of service, and means for using the list to search for an access point.

Another aspect of an access terminal is disclosed. The access terminal includes means for maintaining a database containing a list of access points, and means for searching for an access point that is not on the list.

An aspect of a computer-readable medium is disclosed. The computer-readable medium includes instructions stored thereon. The instructions include a first instruction set for maintaining a database containing a list of access points that have previously served the access terminal with at least a minimum quality of service, and a second instruction set for using the list to search for an access point.

Another aspect of a computer-readable medium is disclosed. The computer-readable medium includes instruction stored thereon. The instructions include a first instruction set for maintaining a database containing a list of access points, and a second instruction set for searching for an access point that is not on the list.

It is understood that other configurations will become readily apparent to those skilled in the art from the following detailed description, wherein it is shown and described only various configurations by way of illustration. As will be realized, the teachings herein may be extended to other and different configurations and its several details are capable of modification in various other respects, all without departing from the spirit and scope of the present disclosure. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In the following detailed description, various techniques will be described for selecting a wireless access point to connect to WAN. Specific examples of access terminals roaming through one or more WLANs will be presented, however, those skilled in the art will understand that the principles illustrated in these examples can be extended to other wireless access networks. Accordingly, these examples, or any other specific configuration described herein, are intended only to illustrate various concepts, with the understanding that these concepts have a wide range of applications.

Figure 1:
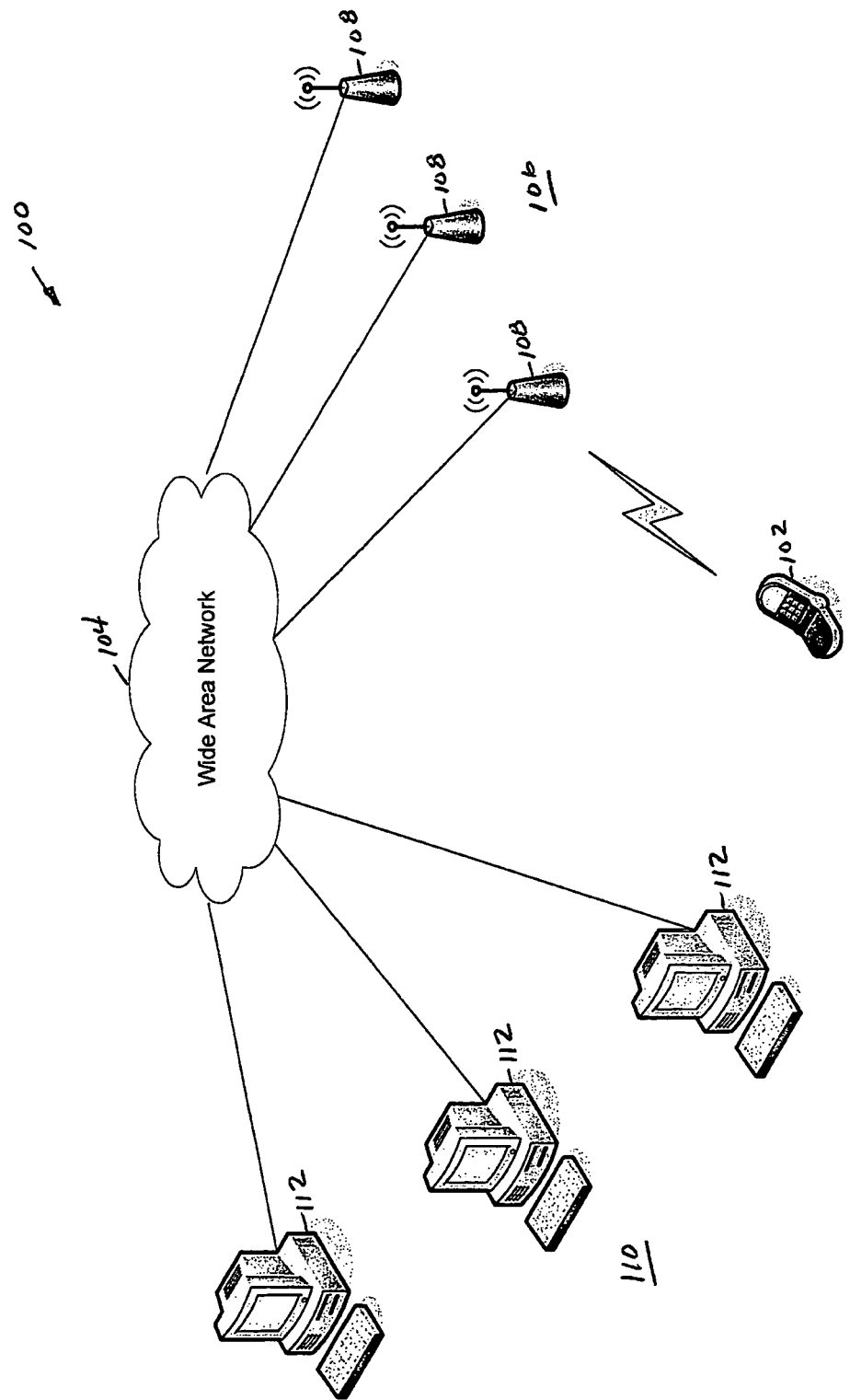
FIG. 1 is a conceptual block diagram illustrating an example of a communications system.

FIG. 1 is a conceptual block diagram of a configuration of a communications system 100. The communications system 100 may include any number of access networks that can be used to connect an access terminal 102 to a WAN 104, such as the Internet or other packet-based network. For example, the communications system 100 may include an access network 106 with several wireless access points 108 as shown in FIG. 1. This type of access network 106 may be a Wi-Fi (or WiMAX) network that is typically used in a private or public building, an office, or even one's home. The communications system 100 may also include another access network 110 comprising several desktop or laptop computers 112, or other peripheral devices such as facsimile machines, copiers, printers, scanners, etc. This type of access network 110 may be a Bluetooth network in a user's home or office where a number of computers 112, or other peripheral devices, are equipped with wireless transceivers capable of communicating with the access terminal 102.

The communications system 100 described in connection with in FIG. 1 is one example of a network configuration. Many alternative configurations are possible. These alternative configurations may use any suitable WLAN technology, such as WiMAX, infrared protocols such as Infrared Data Association (IrDA), UWB, HomeRF, Ethernet compatibility alliance (WECA), 802.11 network technology, or any other suitable wireless technology, or any combination thereof. Moreover, the various concepts described throughout this disclosure may also be applied to a wireless WAN, such as a cellular network utilizing code division multiple access (CDMA), wideband code division multiple access (WCDMA), time division multiple access (TDMA), frequency division multiple access (FDMA), orthogonal frequency division multiple access (OFDMA), or the like.

The access terminal 102 may be any suitable device capable of supporting the wireless protocols of one or both access networks in FIG. 1, such as a wireless telephone, laptop computer, personal digital assistant (PDA), data transceiver, modem, pager, camera, game console, MP3 player, or any other suitable video, audio, or data device. The access terminal 102 may be referred to by those skilled in the art as a handset, wireless communications device, wireless telephone, cellular telephone, user terminal, user equipment, mobile station, mobile unit, subscriber unit, subscriber station, wireless station, mobile radio, radio telephone, wireless device, or some other terminology. The various concepts described throughout this disclosure are intended to apply to all access terminals regardless of their specific nomenclature.

Figure 2:
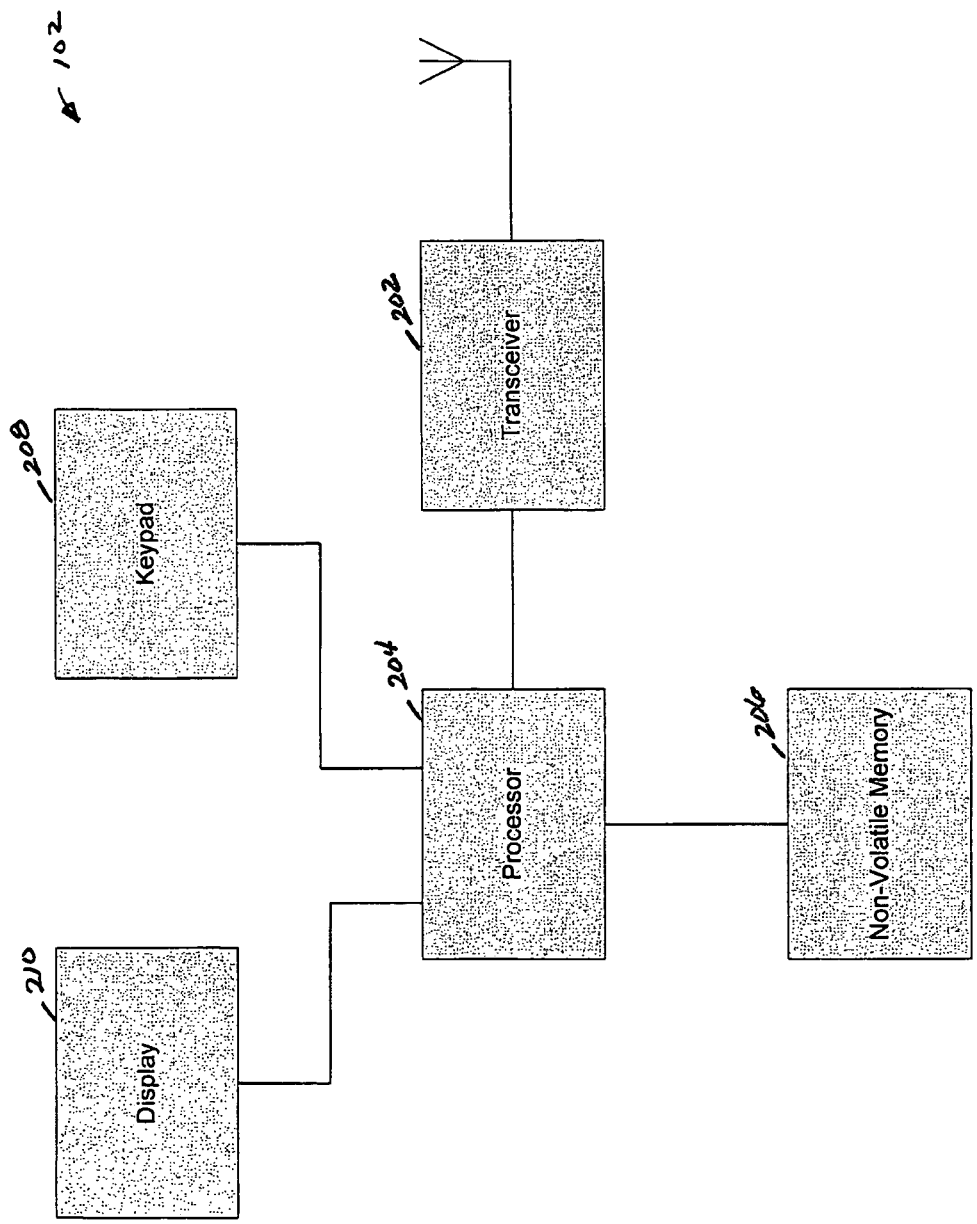
FIG. 2 is a simplified block diagram illustrating an example of an access terminal.

FIG. 2 is a simplified block diagram illustrating an example of an access terminal 102. The access terminal 102 may include a wireless transceiver 202 suitable for supporting one or more wireless protocols. By way of example, the transceiver 202 may be configured to support both Wi-Fi (or WiMAX) and Bluetooth protocols, allowing the access terminal 102 to communicate with the access points in both the access networks 106, 110 shown in FIG. 1. Access terminals capable of supporting multiple wireless protocols may employ a single transceiver, as shown in FIG. 2, or alternatively, may use multiple transceivers. In a multiple transceiver configuration, each transceiver may have its own antenna, or the transceivers could share a single broadband antenna. Those skilled in the art are readily capable of designing the optimal transceiver for any particular application.

The access terminal 102 is also shown with a processor 204 coupled to the transceiver 202. The processor 204 may be implemented with a general purpose processor and volatile memory for storing data and instructions for software programs. The software programs, which may be stored in non-volatile memory 206, may be used by the general purpose processor to control and manage access to the various access networks, as well as provide other communication and processing functions. The software programs may also provide an interface to the general purpose processor for various user interface devices, such as a keypad 208 and display 210. The processor 204 may also include a digital signal processor (DSP) with an embedded software layer to offload various signal processing functions, such as convolutional encoding, modulation and spread-spectrum processing. The DSP may also perform vocoder functions to support telephony applications. Alternatively, the processor 204 may be implemented with one or more application specific processors. The manner in which the processor 204 is implemented will depend on the particular application and the design constraints imposed on the overall system. Those skilled in the art will recognize the interchangeability of hardware, firmware, and software configurations under these circumstances, and how best to implement the described functionality for each particular application.

In principle, the processor 204 can detect the presence of each wireless access point in its vicinity by continuously searching for beacon signals. A list of these wireless access points may be maintained in database and used by the processor 204 to seamlessly move from one access point to another. However, this requires that the receive chain be kept powered on, and in addition, utilizes a significant amount of processor resources, all which increases power consumption and reduces battery life.

A more economical approach in terms of power consumption is to search only for access points that can provide acceptable service to the access terminal 102. A list of these access points, referred to as a "white list," can be stored by the processor 204 in a database maintained in non-volatile memory 206. The white list may include access points that have provided acceptable quality of service in the past, or been provisioned in the database, either by the user or at the factory. The white list may be used to synchronize the passive scan with the sending of the beacon by the access points in the white list, thereby minimizing the time required to refresh an entry.

The white list may include any information that may be useful to the access terminal 102 to detect or associate with an access point, or move from one access point to another. By way of example, the information for each access point entry may include a Basic Service Set Identifier (BSSID), i.e., the access terminal's MAC address in the access point), Service Set Identifier (SSID), i.e., system name, Mobility Domain Identifier (MDID), i.e., MAC address of authenticating entity, a list of neighbor access points including the channel they operate on, a time stamp to indicate the last time the access terminal associated with the access point, the channel of the access point, the IP subnet address, network mask gateway address as well as other potential information learned from DHCP messages exchanged while the last IP address was assigned, security credentials, quality of service, the number of times the access terminal has associated with the access point, and a flag that is set when the access point is the most recent access point used by the access terminal. Those skilled in the art will be readily able to determine the appropriate information to include in the white list depending upon the particular application.

The white list may be used by the processor 204 to quickly discover a suitable access point when the access terminal 102 is turned on, or to seamlessly move from one access point to another during operation. A full search for all access points may be performed if the processor 204 is unable to find a suitable access point contained in the white list.

In at least one configuration of the access terminal 102, the processor 204 also maintains a database in the non-volatile memory 206 containing a list of access points that should be avoided. This list, referred to as a "black list," may include, by way of example, rogue access points. A rogue access point is an access point that is placed in the vicinity of an access network by a malicious individual in an attempt to disturb the service offered by the access network provider. Typically, these rogue access points will not provide WAN connectivity.

The black list may also include access points that have repeatedly failed to provide acceptable service in the past. An access point on the black list may be unable to provide acceptable service because of disturbances in the wireless channel, poor network connectivity, the inability to quickly handoff the access terminal to another access point, or for any other reason that would result in low quality service. Some access points may use local policies such as MAC address filtering or IP address filtering to prevent some access terminals from using them, in which case those access points may be listed in the black list. The black list may also include access points where the access terminal failed to get an IP address. The black list may also include access points where the access terminal failed to authenticate and set up a secure link even though the appropriate credentials were available. Some access points in the black list may feature a poor implementation that makes them unsuitable for a given type of service (VoIP).

The ability of the access terminal 102 to quickly discover an access point on power-up, or seamlessly move from one access point to another, may be significantly improved when the black listed access points are never used. If the processor 204, for example, associated with an access point on the black list, it would consume valuable time discovering that the access point is not offering acceptable service before handing off to another access point. During that time, the quality of service would be poor. Maintaining a black list of access points prevents the processor 204 from associating with known bad access points, and thereby improves the overall quality of handoff. Maintaining that access list also helps minimizing the need for user input in order to determine that an access point is not suitable.

In at least one configuration of the access terminal, the processor 204 may rank the access points in the black list according to how bad the service was. The ranking may provide the processor 204 with the flexibility to use a black listed access point when it cannot locate an access point that is not black listed during a full search. By way of example, an access point that failed to provide acceptable voice quality on one call may receive a favorable black list ranking and could be used by the access terminal 102 under the right circumstances. At the other end of the spectrum, a rogue access point may receive an unfavorable black list ranking and could never be used by the access terminal 102 under any circumstances.

The black list may include any information that may be useful to the access terminal 102. By way of example, the information for each access point entry may include a MAC ID, a ranking, and a reason for failure, e.g., poor quality of service, rogue access point, etc. Those skilled in the art will be readily able to determine the appropriate information to include in the black list depending upon the particular application.

When power is initially applied to the access terminal 102, the processor 204 uses the white and black list to select an access point. This can be achieved by first limiting the search for an access point to those contained in the white list. In one configuration of the access terminal 102, the white list can be used by the processor 204 to identify the few most recently used access points. As indicated above, a flag can be set for the last access point used by the access terminal 102. In this configuration, the processor 204 uses the flag to retrieve information from the white list that allows the processor 204 to tune the transceiver 202 to the channel where the access point was last seen and search for that access point.

In the event that the processor 204 cannot find the last access point used by the access terminal 102, which might be the case if the access terminal 102 has traveled a distance since the last time it was operational, the processor 204 then attempts to locate another suitable access point on the white list. Any suitable searching methodology may be used. By way of example, the processor 204 can first search for other white listed access points on the same channel. If this search fails, the processor 204 can tune the transceiver 202 to another channel and search for all access points in the white list that were last seen on that channel. If that search fails, this process is repeated on each channel until a suitable access point on the white list is found. The order in which the channels are scanned may be selected by the processor 204 heuristically according to the probability of finding a white listed access point on a channel, or by any other suitable means.

Once the processor 204 locates a suitable access point on the white list, it sets up a wireless connection with that access point and establishes a network connection to the WAN. The processor 204 may then update the information in the white list for that access point. By way of example, the processor 204 may update the timestamp, increase a variable indicating the number of times that the access terminal has visited that access point, update the IP subnet address, set flag for the access point indicating that it is the most recently used access point, update one or more quality of service metrics, and modify any other information that is pertinent.

Various quality of service metrics can be computed by the processor 204. These metrics may be used to update the information in the white list, to initiate a handoff to another access point if the quality is too low, or to move the access point to the black list if the quality is poor over a long duration. These metrics may include, by way of example, the signal strength of the beacon signal and the loading on the access point. Various metrics related to the quality of the network connection may also be computed, such as delay, jitter, and the number of retransmitted and lost packets. Historical information may also provide useful quality of service metrics. Historical information may include the number of failed attempts to associate with the access point, the number of times the access point sent a disassociation frame to the station, dropped calls, the number of failed attempts to connect to the WAN, the number of failed SIP registrations, and the time to complete the SIP registrations (i.e., the VoIP setup latency). Various methods for determining these metrics are well known in the art.

In the event that the processor 204 is unable to find an access point on the white list, then it may do a full search to find a suitable access point that is not contained in the black list. The full search generally entails a scan of all channels to discover access points in the vicinity of the access terminal 102. During the full search, the processor 204 will ignore any black listed access point that responds to a probe request. The processor 204 then attempts to associate with one of the non-black listed access points discovered by the full search based on signal strength or some other criteria. The processor 204 associates with the selected access point by setting up a wireless connection and then establishing a network connection to the WAN. If the processor 204 is unable to establish a wireless or network connection or encounters other problems that make the service unacceptable, it may add the selected access point to the black list and select another access point.

Once the processor 204 has successfully established a wireless connection to an access point and a network connection to the WAN, it may monitor various quality of service metrics described in more detail above. If the processor 204 determines that the quality of service is acceptable, it can create an entry in the white list for the access point. As part of the entry, the processor 204 may also create a neighbor list of access points using the information it obtained from the full search. As will be described in greater detail shortly, the neighbor list may be used by the processor to improve the quality of handoff. If, on the other hand, the processor 204 determines that the quality of service is unacceptable, then the processor 204 may select another access point from its search. In addition, the processor 204 may also add the low quality access point to the black list. In some configurations of the access terminal 102, the processor 204 may also rank the low quality access point.

The white and black list may also be used by the processor 204 to handoff the access terminal from one access point to another as the user roams through the communications system. Typically, as the user moves through the communications system, the processor 204 will detect a change in the signal strength of the data received from the access point that it is associated with. The strength of the signal will generally increase as the user moves closer to the access point and decrease as the user moves further away from the access point. When the signal strength of the beacon from the access point falls below a certain level or some of the quality metrics described above indicate poor standing, the processor 204 may begin the process of searching for another access point to handoff the access terminal to.

The handoff process begins with the processor 204 accessing the neighbor list for the serving access point, i.e., the access point that the access terminal is associated with. The neighbor list may include all neighboring access points for the serving access point, or a filtered neighbor list with only white listed access points. Either way, the processor 204 will begin a search for a neighboring access point by scanning the channels of the access points that are both contained in the neighbor list of the serving access point and white listed. Any suitable searching methodology may be used. By way of example, the order in which the channels are scanned may be selected by the processor 204 heuristically according to the probability of finding a white listed access point on that channel, or by any other suitable means. Also, when searching for white-listed neighbors the passive scan may be used efficiently in the following way: any frame sent in the neighbor's system will contain an identifier (the BSSID) which allows the processor 204 to detect the presence of that neighbor. Furthermore the processor 204 need not wait to receive a beacon from that neighbor access point since the relevant data is already stored in the white list. The only information required is the signal strength which can be obtained by receiving a single frame of any type from the neighbor access point. Such frames come more frequently than beacons thus make the passive scan more efficient.

Once the processor 204 locates a suitable access point on the white list, it compares the signal strength of the target access point with that of the serving access point. The processor 204 may determine that the target access point is a suitable candidate for handoff if the signal strength of the target access point's beacon continues to increase as the signal strength of the serving access point's beacon decreases. Or the processor 204 may compare the difference of strength against a threshold. At some point, the processor 204 initiates the handoff by terminating the wireless connection with the serving access point and establishing a new wireless connection with the target access point. Once the wireless connection is established with the target access point, a connection can be made to the WAN. The handoff is typically a hard handoff, but may be implemented in an alternative configuration as a soft handoff.

Once the wireless connection with the target access point is established, the processor 204 can terminate the wireless connection with the serving access point. This is known as a "soft handoff" because the wireless connection between the access terminal 102 and serving access point is terminated after the wireless connection is made by the access terminal 102 to the target access point. In any event, once the handoff is complete, the processor may update the information in the white list for the new serving access point.

In the event that the processor 204 is unable to find an access point on the serving access point's neighbor list, then it may do a full search to find a suitable access point that is not contained in the black list. The full search generally entails a scan of all channels to discover access points in the vicinity of the access terminal 102. The processor 204 then attempts to associate with one of the access points discovered by the full search based on the signal strength of the target access point or some other criteria. The processor 204 associates with the target access point by setting up a wireless connection and then establishing a network connection to the WAN. If the processor 204 is unable to establish a wireless or network connection, it may add the target access point to the black list and find another access point to hand off the access terminal 102 to.

Once the processor 204 has identified a target access point, it may begin the handoff process using either a soft or hard handoff. Once the handoff is completed, the processor 204 may monitor various quality of service metrics, as described in more detail above. If the processor 204 determines that the quality of service is acceptable, it can create an entry in the white list for the access point. If, on the other hand, the processor 204 determines that the quality of service is unacceptable, then the processor 204 may select another access point from its search to handoff the access terminal 102 to. In addition, the processor 204 may also add the access point to the black list, and in some cases, rank the access point.

Figure 3:
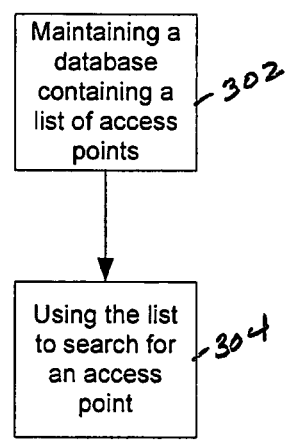
FIG. 3 is a flow chart illustrating an example of a process for selecting an access point.

FIG. 3 is a flow chart illustrating an example of a process for selecting an access point. In step 302, a database is maintained in an access terminal. The database contains a list of access points that have previously served the access terminal with at least a minimum quality of service. In step 304, the list is used to search for an access point. The access terminal searches for each of the access points listed in the database before searching for other access points. When the search for an access point listed in the database is unsuccessful, the access point selects one of the access points not listed in the database, and adds the selected access point to the database.

The database may include information identifying the last access point serving the access terminal. The access terminal may search for the last access point it associated with before searching for the remaining access points listed in the database.

The database may include information identifying neighbor access points for each of the access points listed in the database. The access terminal may search for each of the access points neighbor to the serving access point before searching for other access points. The search for each of the access points neighbor to the serving access point may be performed without waiting for a beacon from any of the neighbor access points. More specifically, the search may include detecting the existence of one of the access points neighbor to the serving access point by receiving a frame sent from the one of the access points neighbor to the serving access point. The access terminal attempts to select one of the access points neighbor to the serving access that is already listed in the database. The selection of access points neighbor to the serving access point may be based on the quality of service or connectivity for each of the access points neighbor to the serving access point. This information may also be maintained in the database.

Figure 4:
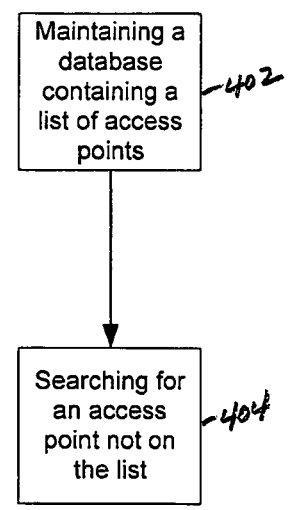
FIG. 4 is a flow chart illustrating another example of a process for selecting an access point.

FIG. 4 is a flow chart illustrating another example of a process for selecting an access point. In step 402, the access terminal maintains a database containing a list of access points. In step 404, the access terminal searches for an access point that is not on the list. In one configuration, the access terminal is prohibited from associating with, or handing off to, an access point on the list. In another configuration, the access terminal may associate with, or handoff to, an access points on the list only when an access point that is not on the list is not discovered during the search.

Figure 5:
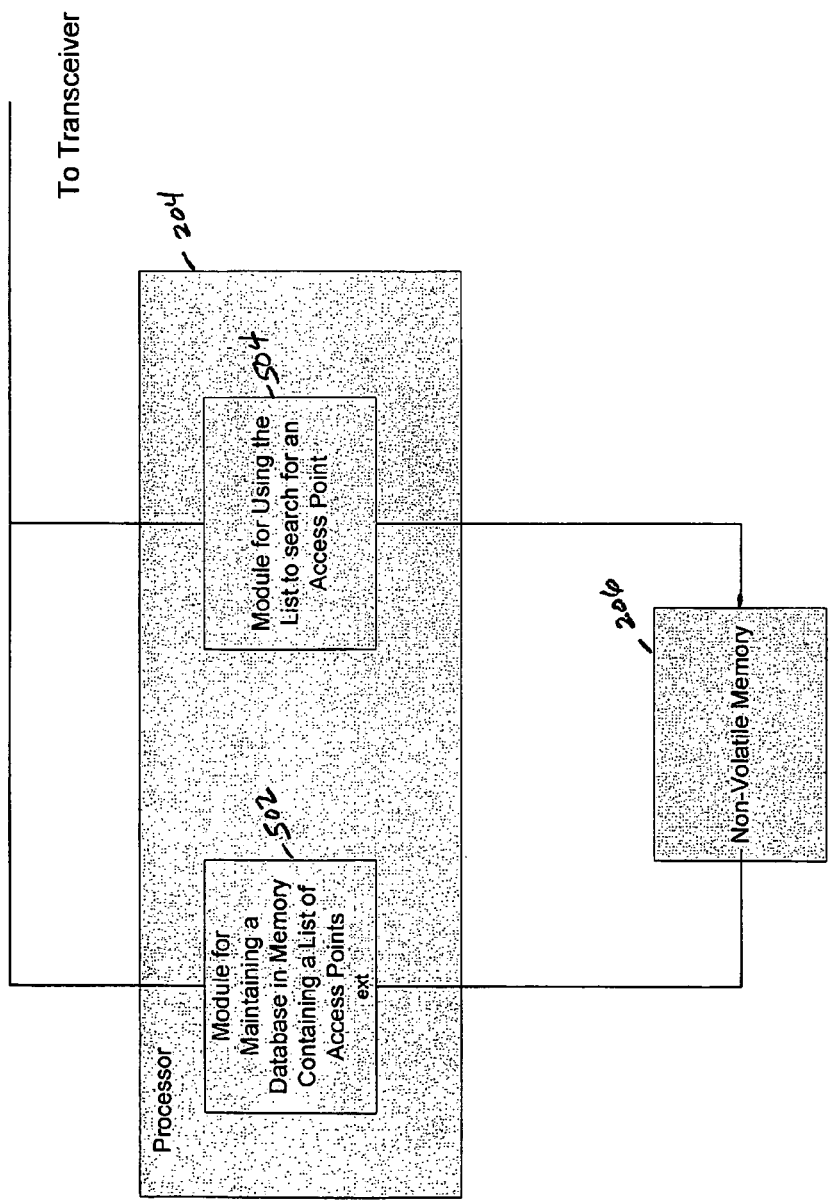
FIG. 5 is a functional block diagram of the processor and non-volatile memory an the access terminal.

FIG. 5 is a functional block diagram of the processor and non-volatile memory in the access terminal. The processor 204 includes a module 502 for maintaining a database in the non-volatile memory 206. The database contains a list of access points that have previously served the access terminal with at least a minimum quality of service. The processor 204 also includes a module 504 for using the list in the non-volatile memory 206 to search for an access point. The module 504 may be used to search for an access point to associate with, or handoff to. The module 504 may search an access point listed in the database before searching for other access points. The module may select an access points not listed in the database when the search for an access point listed in the database is unsuccessful. In that case, the module 504 may add the selected access point to the database.

The database may include information identifying the last access point serving the access terminal. The module 504 may search for the last access point before searching for the remaining access points listed in the database.

The database may include information identifying neighbor access points for each of the access points listed in the database. The module 504 may search for an access points neighbor to the serving access point before searching for other access points. The module 504 may search for an access point neighbor to the serving access point without waiting for a beacon from any of the neighbor access points. More specifically, the module 504 may search for an access points neighbor to the serving access point by detecting the existence of one of the access points neighbor to the serving access point by receiving a frame sent from the one of the access points neighbor to the serving access point. The module 504 attempts to select one of the access points neighbor to the serving access that is already listed in the database. The selection of access points neighbor to the serving access point may be based on the quality of service or connectivity for each of the access points neighbor to the serving access point. This information may also be maintained in the database.

The module 502 may also maintain in the database a second list of access points. The module 504 may search for an access point that is not on the second list. In one configuration, the module 504 prohibit the access terminal from associating with, or handing off to, an access point on the second list. In another configuration, the module 504 allows the access terminal to associating with, or handoff to, an access point on the second list only when an access point that is not on the second list is not discovered during the search.

The various illustrative logical blocks, modules, circuits, elements, and/or components described in connection with the configurations disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the configurations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various configurations described herein. Various modifications to these configurations will be readily apparent to those skilled in the art, and the generic principles defined herein may be applied to other configurations. Thus, the claims are not intended to be limited to the configurations shown herein, but is to be accorded the full scope consistent with the language claims, wherein reference to an element in the singular is not intended to mean "one and only one" unless specifically so stated, but rather "one or more." All structural and functional equivalents to the elements of the various configurations described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An access terminal, comprising:
memory; and
a processor configured to maintain in the memory a database containing a first list of access points, wherein the only access points in the first list are those that have previously served the access terminal with acceptable quality of service, the processor being further configured to use the first list to search for an access point, wherein the database includes information identifying neighbor access points for each of the access points in the first list, wherein the processor is further configured to search for access points neighbor to a serving access point before searching for other access points, and wherein the processor is further configured to search for the access points neighbor to the serving access point without waiting for a beacon from any of the access points neighbor to the serving access point.

2. The access terminal of claim 1, wherein the access terminal is to be associated with the access point.

3. The access terminal of claim 1, wherein the access terminal is to be handed off to the access point.

4. The access terminal of claim 1, wherein the database includes information identifying the last access point serving the access terminal, and wherein the processor is further configured to search for the last access point before searching for the remaining access points in the first list.

5. The access terminal of claim 1, wherein the processor is further configured to detect the existence of one of the access points neighbor to the serving access point by receiving a frame sent from the one of the access points neighbor to the serving access point.

6. The access terminal of claim 1, wherein the processor is further configured to select one of the access points neighbor to the serving access point, the selected access point being one of the access points in the first list.

7. The access terminal of claim 6, wherein the database includes information relating to the quality of service or connectivity for each of the access points in the first list, and wherein the processor is further configured to select one of the access points neighbor to the serving access point based on the quality of service or connectivity for each of the access points neighbor to the serving access point.

8. The access terminal of claim 1, further comprising a second list of access points, wherein the only access points in the second list are those that have previously served the access terminal with unacceptable quality of service, and wherein the processor is further configured to search for an access point that is not contained within the second list only if none of the access points in the first list can be found.

9. The access terminal of claim 1, further comprising a second list of access points, wherein the only access points in the second list are those that have previously served the access terminal with unacceptable quality of service, and wherein the processor is further configured to search for access points to associate with and to associate with one of the access points on the second list discovered during the search only when an access point that is not on the second list is not discovered during the search.

10. The access terminal of claim 1, further comprising a second list of access points, wherein the only access points in the second list are those that have previously served the access terminal with unacceptable quality of service, wherein the processor is further configured to search for access points to handoff the access terminal to, and wherein the processor is further configured to handoff the access terminal to one of the access points on the second list discovered during the search only when an access point that is not on the second list is not discovered during the search.

11. A method of communications on an access terminal, comprising:
maintaining a database containing a first list of access points, wherein the only access points in the first list are those that have previously served the access terminal with acceptable quality of service, and wherein the database includes information identifying neighbor access points for each of the access points in the first list;
using the first list to search for an access point, wherein the access terminal searches for each of the access points in the first list before searching for other access points; and
searching for access points neighbor to a serving access point before searching for other access points, wherein the access terminal searches for the access points neighbor to the serving access point without waiting for a beacon from any of the access points neighbor to the serving access point.

12. The method of claim 11, wherein the use of the first list comprises searching for an access point to associate with.

13. The method of claim 11, wherein the use of the first list comprises searching for an access point to hand off the access terminal.

14. The method of claim 11, wherein the database includes information identifying the last access point serving the access terminal, and wherein the use of the first list comprises searching for the last access point before searching for the remaining access points in the first list.

15. The method of claim 11, wherein the search for each of the access points neighbor to the serving access point comprises detecting the existence of one of the access points neighbor to the serving access point by receiving a frame sent from the one of the access points neighbor to the serving access point.

16. The method of claim 11, further comprising selecting one of the access points neighbor to the serving access point, the selected access point being one of the access points in the first list.

17. The method of claim 16, wherein the database includes information relating to the quality of service or connectivity for each of the access points in the first list, and wherein the selection of one of the access points neighbor to the serving access point is based on the quality of service or connectivity for each of the access points neighbor to the serving access point.

18. The method of claim 11, wherein the access terminal further comprises a second list of access points, wherein the only access points in the second list are those that have previously served the access terminal with unacceptable quality of service, and further comprising searching for an access point that is not contained within the second list only if none of the access points in the first list can be found.

19. The method of claim 11, wherein the access terminal further comprises a second list of access points, wherein the only access points in the second list are those that have previously served the access terminal with unacceptable quality of service, and further comprising searching for access points to associate with and associating with one of the access points on the second list discovered during the search only when an access point that is not on the second list is not discovered during the search.

20. The method of claim 19, wherein the access terminal further comprises a second list of access points, wherein the only access points in the second list are those that have previously served the access terminal with unacceptable quality of service, and further comprising:

searching for access points to handoff the access terminal to; and handing off the access terminal to one of the access points on the second list discovered during the search only when an access point that is not on the second list is not discovered during the search.

21. An access terminal, comprising:

means for maintaining a database containing a first list of access points, wherein the only access points in the first list are those that have previously served the access terminal with acceptable quality of service, and wherein the database includes information identifying neighbor access points for each of the access points in the first list;

means for using the first list to search for an access point, wherein the access terminal searches for each of the access points in the first list before searching for other access points; and means for searching for access points neighbor to a serving access point before searching for other access points, wherein the access terminal searches for the access points neighbor to the serving access point without waiting for a beacon from any of the access points neighbor to the serving access point.

22. The access terminal of claim 21 wherein the means for using the first list comprises means for searching for an access point to associate with.

23. The access terminal of claim 21 wherein the means for using the first list comprises means for searching for an access point to hand off the access terminal to.

24. The access terminal of claim 21, wherein the database includes information identifying the last access point serving the access terminal, and wherein the means for using the first list comprises means for searching for the last access point before searching for the remaining access points in the first list.

25. The access terminal of claim 21, wherein the means for searching for each of the access points neighbor to the serving access point comprises means for detecting the existence of one of the access points neighbor to the serving access point by receiving a frame sent from the one of the access points neighbor to the serving access point.

26. The access terminal of claim 25, further comprising means for selecting one of the access points neighbor to the serving access point, the selected access point being one of the access points in the first list.

27. The access terminal of claim 21, wherein the database includes information relating to the quality of service or connectivity for each of the access points in the first list, and wherein the means for selecting one of the access points neighbor to the serving access point is based on the quality of service or connectivity for each of the access points neighbor to the serving access point.

28. The access terminal of claim 21, wherein the access terminal further comprises a second list of access points, wherein the only access points in the second list are those that have previously served the access terminal with unacceptable quality of service, and further comprising means for searching for an access point that is not contained within the second list only if none of the access points in the first list can be found.

29. The access terminal of claim 21, wherein the access terminal further comprises a second list of access points, wherein the only access points in the second list are those that have previously served the access terminal with unacceptable quality of service, and further comprising:

means for searching for access points to associate with; and means for associating with one of the access points on the second list discovered during the search only when an access point that is not on the second list is not discovered during the search.

30. The access terminal of claim 21, wherein the access terminal further comprises a second list of access points, wherein the only access points in the second list are those that have previously served the access terminal with unacceptable quality of service, and further comprising:

means for searching for access points to handoff the access terminal to; and means for handing off the access terminal to one of the access points on the second list discovered during the search only when an access point that is not on the second list is not discovered during the search.

31. A non-transitory computer-readable storage medium including instructions stored thereon, comprising:

a first instruction set for maintaining, at an access terminal, a database containing a first list of access points, wherein the only access points in the first list are those that have previously served the access terminal with acceptable quality of service, and wherein the database includes information identifying neighbor access points for each of the access points in the first list;

a second instruction set for using the first list to search for an access point, wherein the access terminal searches for each of the access points in the first list before searching for other access points; and a third instruction set for searching for access points neighbor to a serving access point before searching for other access points, wherein the access terminal searches for the access points neighbor to the serving access point without waiting for a beacon from any of the access points neighbor to the serving access point.

32. The computer-readable medium of claim 31, wherein the second instruction set comprises a fourth instruction set for searching for an access point to associate with.

33. The computer-readable medium of claim 31, wherein the second instruction set comprises a fourth instruction set for searching for an access point to hand off the access terminal.

34. The computer-readable medium of claim 31, wherein the database includes information identifying the last access point serving the access terminal, and wherein the second instruction set comprises a fourth instruction set for searching for the last access point before searching for the remaining access points in the first list.

35. The computer-readable medium of claim 31, wherein the access terminal further comprises a second list of access points, wherein the only access points in the second list are those that have previously served the access terminal with unacceptable quality of service, and further comprising a fourth instruction set for searching for an access point that is not contained within the second list only if none of the access points in the first list can be found.

36. The computer-readable medium of claim 31, wherein the access terminal further comprises a second list of access points, wherein the only access points in the second list are those that have previously served the access terminal with unacceptable quality of service, and further comprising:

a fourth instruction set for searching for access points to associate with; and a fifth instruction set for associating with one of the access points on the second list discovered during the search only when an access point that is not on the second list is not discovered during the search.

37. The computer-readable medium of claim 31, wherein the access terminal further comprises a second list of access points, wherein the only access points in the second list are those that have previously served the access terminal with unacceptable quality of service, and further comprising:
- a fourth instruction set for searching for access points to handoff the access terminal to; and
- a fifth instruction set for handing off the access terminal to one of the access points on the second list discovered during the search only when no other access point that is not on the second list is discovered during the search.

38. The method of claim 11, wherein the using step includes:
- determining a subset of channels, from among a plurality of channels, that are associated with the access points in the first list; and
- searching each of the subset of channels for one or more of the listed access points before searching channels among the plurality of channels that are not in the subset.

39. The method of claim 11, wherein the access terminal further comprises a second list of access points, wherein the only access points in the second list are those that have previously served the access terminal with unacceptable quality of service, and wherein the maintaining step includes:
- connecting to a given access point;
- determining that the given access point does not satisfy the minimum quality of service; and
- adding the given access point to the second list of access points within the database.

\* \* \* \* \*